(12) United States Patent
Sakakura et al.

(10) Patent No.: US 6,689,479 B2
(45) Date of Patent: Feb. 10, 2004

(54) ANTI-REFLECTION FILM, AND SILICA LAYER

(75) Inventors: Osamu Sakakura, Tokyo-to (JP); Tatsuji Nakajima, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 10/229,310

(22) Filed: Aug. 27, 2002

(65) Prior Publication Data

US 2003/0072895 A1 Apr. 17, 2003

(30) Foreign Application Priority Data

Aug. 28, 2001 (JP) .................................... P2001-258206
Sep. 27, 2001 (JP) .................................... P2001-298360

(51) Int. Cl.[7] ................................................ B32B 9/00
(52) U.S. Cl. ...................... 428/446; 448/699; 448/689; 448/702; 448/913
(58) Field of Search ................................ 428/446, 448, 428/699, 689, 702, 913

(56) References Cited

U.S. PATENT DOCUMENTS 5,053,345 A * 10/1991 Schnable et al. .............. 437/21
6,207,263 B1 * 3/2001 Takematsu et al. ......... 428/220

* cited by examiner

Primary Examiner—Deborah Jones
Assistant Examiner—Ling Xu
(74) Attorney, Agent, or Firm—Ladas & Parry (57) ABSTRACT

A main object is to provide an anti-reflection film in which the resistance to wet heat of each thin layer constituting a layer stack is better, the optical properties are excellent, a formation rate is high, and the adherability of each thin layer is excellent.

The layer stack in an anti-reflection film is formed by depositing a thin layer formed by a plasma CVD method and a thin layer formed by a sputtering method or a evaporation method. In addition, a silica layer as a low refractive index layer is a prescribed silica layer.

10 Claims, 7 Drawing Sheets

ANTI-REFLECTION FILM, AND SILICA LAYER

BACKGROUND OF THE INVENTION

1. Field of the Invention

The present invention relates to an anti-reflection film, and a silica layer which can be suitably used for this.

2. Related Art

Transparent substrates such as glasses and plastics are used in various displays used in liquid crystal displays, plasma displays, CRT displays of computers, word processors, televisions, display plates and the like, indicators such as instruments and the like, rearview mirrors, goggles, window glasses and the like. Since letters and figures and other information are read out through those transparent substrates, there is a drawback that, when the light is reflected on the surfaces of the transparent substrates, it becomes difficult to read out the information.

Currently, in order to solve the above drawbacks, light reflection is prevented by using an anti-reflection film comprising a substrate, a hard coated layer, and a layer stack formed by depositing a plurality of thin layers having different refractive indices (e.g. low refractive index layer, intermediate refractive index layer, high refractive index layer), and applying the anti-reflection film on the surface of the above transparent substrate.

In this case, it is known that provision of a layer having a small refractive index for effectively preventing light reflection, so-called a low refractive index layer on an outermost layer in the anti-reflective film with a layer stack provided thereon (surface opposite to a substrate of the anti-reflection film) is preferable and, as the layer having a small refractive index, a silica layer is suitably used.

In addition, as a method of forming a layer stack, a method of formation by a sputtering method or a evaporation method has been previously known.

However, when a layer stack is formed by a sputtering method, there is a problem that precision in layer formation is better, but since a formation rate is very small, the productivity is deteriorated. In addition, when a layer stack is formed by a evaporation method, there is no problem in a rate of layer formation, but formation precision is bad and, therefore, yield is deteriorated, and this may lead to the high cost of the anti-reflection film, being problematic.

In order to solve the aforementioned problems, currently, a method of forming a layer stack by a plasma CVD method is developed. By forming a layer stack by a plasma CVD method, a formation rate can be dramatically heightened as compared with formation by a sputtering method or the like.

SUMMARY OF THE INVENTION

However, when a layer stack is formed by a plasma CVD method, the following problems arise newly.

The first problem is that the adherability between respective thin layers forming a layer stack is deteriorated as compared with the case where a layer stack is formed by a sputtering method or a evaporation method.

In addition, the second problem is that, when a titanium oxide layer functioning as a high refractive index layer among thin layers forming a layer stack is formed by a plasma CVD method, the titanium oxide layer is bad in the resistance to wet heat, and a refractive index is not stable in some cases.

A main object of the present invention is to provide, in an anti-reflection film having a layer stack, an anti-reflection film in which each thin layer constituting a layer stack has the better resistance to wet heat and, therefore, the optical properties are excellent due to stable refractive index in each thin layer and, further, a formation rate is high, and the adherability of each thin layer is also excellent.

In addition, apart from the above problems, there is a new problem that a layer stack of an anti-reflection film prepared by a plasma CVD method is inferior in the resistance to chemicals. For example, in a process of preparing an anti-reflection film, there is a process of treating a layer stack with an alkali in some cases and, upon this, a thin layer formed by a plasma CVD method is dissolved in an alkali solution in some cases.

In particular, a low refractive index layer in a layer stack in an anti-reflection film is used as an outermost layer of a layer stack in many cases and, therefore, since the layer is directly contacted with an alkali solution upon the alkali-treatment, the layer is dissolved in many cases.

In order to solve such the problem, a protecting film is adhered on an outermost layer of a layer stack upon the alkali-treatment, but this can not be said to be a fundamental resolution strategy. In addition, since it is necessary to detach the protecting film, there is a problem that a preparation process becomes complicated.

The present invention has been achieved in order to solve the above problems. It is an object of this invention to provide an anti-reflection film which is excellent in the resistance to chemicals even when formed by a plasma CVD method, and a silica layer.

The present invention for attaining the aforementioned object, firstly, an anti-reflection film having a substrate, a hard coated layer situated on the substrate, and a layer stack which is situated on the hard coated layer and in which a plurality of thin films are deposited, wherein the layer stack is formed by depositing a thin layer formed by a plasma CVD method, and a thin layer formed by a sputtering method or a evaporation method.

According to this invention, since a layer stack constituting an anti-reflection film is formed by depositing a thin layer formed by a plasma CVD method and a thin layer formed by a sputtering method or a evaporation method, the productivity can be improved as compared with formation of all thin layers constituting a layer stack by a sputtering method or a evaporation method and, on the other hand, the resistance to wet heat of each thin layer can be improved and, at the same time, the adherability between respective layers can be improved.

In addition, in the first invention, it is preferable that, among the aforementioned thin layers forming a layer stack, a thin layer formed by a plasma CVD method is a low refractive index layer having a refractive index of not less than 1.40 and not greater than 1.46 ($\lambda$=550 nm), or an intermediate refractive index layer having a refractive index of not less than 1.55 and less than 1.80 ($\lambda$=550 nm), and a thin layer formed by a sputtering method or a deposition layer is a high refractive index layer having a refractive index of not less than 1.80 ($\lambda$=550 nm).

According to this aspect, a formation rate can be heightened by forming a low refractive index layer or an intermediate refractive index layer which dose not give rise to a problem when formed by a plasma CVD method (that is, dose not give rise to a problem in the resistance to wet heat) by a plasma CVD method and, on the other hand, a refractive index of a high refractive index layer can be stabilized by forming only a high refractive index layer in which a refractive index is not stabilized in some cases due to bad resistance to wet heat when formed by a plasma method, by a sputtering method.

In addition, in the first invention, the layer construction of the layer stack may be an intermediate refractive index layer, a high refractive index layer and a low refractive index layer from a hard coated layer side.

Further, in the first invention, the layer construction of the layer stack may be a high refractive index layer, a low refractive index layer, a high refractive index layer and a low refractive index layer from a hard coated layer side.

In addition, in the first invention, a low refractive index layer or an intermediate refractive index layer formed by the plasma CVD method may be a silicon layer, and a high refractive index layer formed by a sputtering method or a evaporation method may be a titanium oxide layer or an ITO layer exhibiting a high resistance.

The present invention for attaining the aforementioned object is, secondly, an anti-reflection film having a substrate, a hard coated layer situated on the substrate, and a layer stack which is situated on the hard coated layer and in which a plurality of thin layers are deposited, wherein a silica layer formed by a plasma CVD method, having a refractive index of 1.40–1.46 ($\lambda$=550 nm), and having infra-red absorption based on C—H stretching vibration at 2800–3000 $cm^{-1}$ of not greater than 0.1 $cm^{-1}$ and infra-red absorption based on Si—$CH_3$ stretching vibration at 1200–1400 $cm^{-1}$ of not greater than 0.1 $cm^{-1}$, as a low refractive layer is present in the aforementioned layer stack.

According to this invention, since a silica layer as a low refractive index layer in an anti-reflection film is formed by a plasma CVD method and has a refractive index of 1.40–1.46 ($\lambda$=550 nm), the silica layer is excellent in the adherability, and has a high formation rate. In addition, the silica layer is excellent in the optical properties and can effectively prevent light reflection and, at the same time, can be used as a low refractive index layer in a layer stack in an anti-reflection film and, as a result, the better anti-reflection film is obtained. Further, since infra-red absorption based on C—H stretching vibration at 2800–3000 $cm^{-1}$ and infra-red absorption based on Si—$CH_3$ stretching vibration at 1200 to 1400 $cm^{-1}$ are 0.1 $cm^{-1}$ or smaller, respectively, that is, are below a detection limit, it is clear that little organic components are contained in a silica layer and, as a result, a silica layer is thought to be excellent in the resistance to chemicals, although formed by a plasma CVD method.

In addition, in the second invention, it is preferable that a raw material upon formation of a silica layer as the low refractive index layer by a plasma CVD method is Si alkoxide.

In addition, in the second invention, it is preferable that the aforementioned Si alkoxide as a raw material is tetramethoxysilane.

Further, in the second invention, at least one of an intermediate refractive index layer having a refractive index of not less than 1.55 and less than 1.80 ($\lambda$=550 nm) or a high refractive index layer having a refractive index layer not less than 1.80 ($\lambda$=550 nm) may be in the aforementioned layer stack, in addition to a silica layer as a low refractive index layer.

In addition, in the second invention, the layer construction of the aforementioned layer stack may be an intermediate refractive index layer, a high refractive index layer, and a silica layer as a low refractive index layer from a hard coated layer side.

Still further, in the second invention, the layer construction of the aforementioned layer stack may be a high refractive index layer, a silica layer as a low refractive index layer, a high refractive index layer, and a low refractive index layer from a hard coated layer side.

The present invention for attaining the aforementioned object is, thirdly, an anti-reflective film having a substrate, a hard coated layer situated on the substrate, and a layer stack which is situated on the hard coated layer and in which a plurality fo thin layers are deposited, wherein a silica layer, as a low refractive index layer, formed by a plasma CVD method, having a refractive index of 1.40–1.46 ($\lambda$=550 nm) and having infra-red absorption based on C—H stretching vibration at 2800–3000 $cm^{-1}$ of not greater than 0.1 $cm^{-1}$ and infra-red absorption based on Si—$CH_3$ stretching vibration at 1200–1400 $cm^{-1}$ of not greater than 0.1 $cm^{-1}$, and a high refractive index layer formed by a sputtering method or a evaporation method and having a refractive index of not less than and less than 1.80 ($\lambda$=550 nm) are present in the layer stack.

In the third invention, an intermediate refractive index layer having a refractive index of not less than 1.55 and less than 1.80 ($\lambda$=550 nm) may be present in the layer stack.

In addition, in the third invention, the layer construction of the layer stack may be an intermediate refractive index layer, a high refractive index layer, and a silica layer as a silica layer as a low refractive index layer from a hard coated layer side.

Further, in the third invention, the layer construction of the layer stack may be a high refractive index layer, a silica layer as a low refractive index layer, a high refractive index layer, and a silica layer as a low refractive index layer from a hard coated layer side.

The present invention for attaining the aforementioned object is, fourthly, a silica layer as a low refractive index layer in an anti-reflection film such that it is formed by a plasma CVD method, a refractive index thereof is 1.40–1.46 ($\lambda$=550 nm), and infra-red absorption based on C—H stretching vibration at 2800–3000 $cm^{-1}$ and infra-red absorption based on Si—$CH_3$ stretching vibration at 1200–1400 $cm^{-1}$ are 0.1 $cm^{-1}$ or smaller, respectively.

According to this invention, since a silica layer is formed by a plasma CVD method, and has a refractive index of 1.40–1.46 ($\lambda$=550 nm), the silica layer is excellent in the optical properties, can effectively prevent light reflection and, at the same time, and can be used as a low refractive index layer in a layer stack of an anti-reflection layer. Further, since infra-red absorption based on C—H stretching vibration at 2800–3000 $cm^{-1}$ and infra-red absorption based on Si—$CH_3$ stretching vibration at 1200–1400 $cm^{-1}$ are 0.1 $cm^{-1}$ or smaller, respectively, that is, are below a detection limit, it is clear that little organic components are contained in a silica layer and, as a result, a silica layer is thought to be excellent in the resistance to chemicals although formed by a plasma CVD method.

The present invention further includes other many embodiments illustrated in detail below. In addition, a person skilled in the art can understand that the present invention includes other many embodiments which are altered or modified from the present invention based on the detailed description below without departing the concept and category of the present invention which is limited only by the description of claims.

DETAILED DESCRIPTION OF THE PREFERABLE EMBODIMENTS

<First Embodiment>

Figure 1:
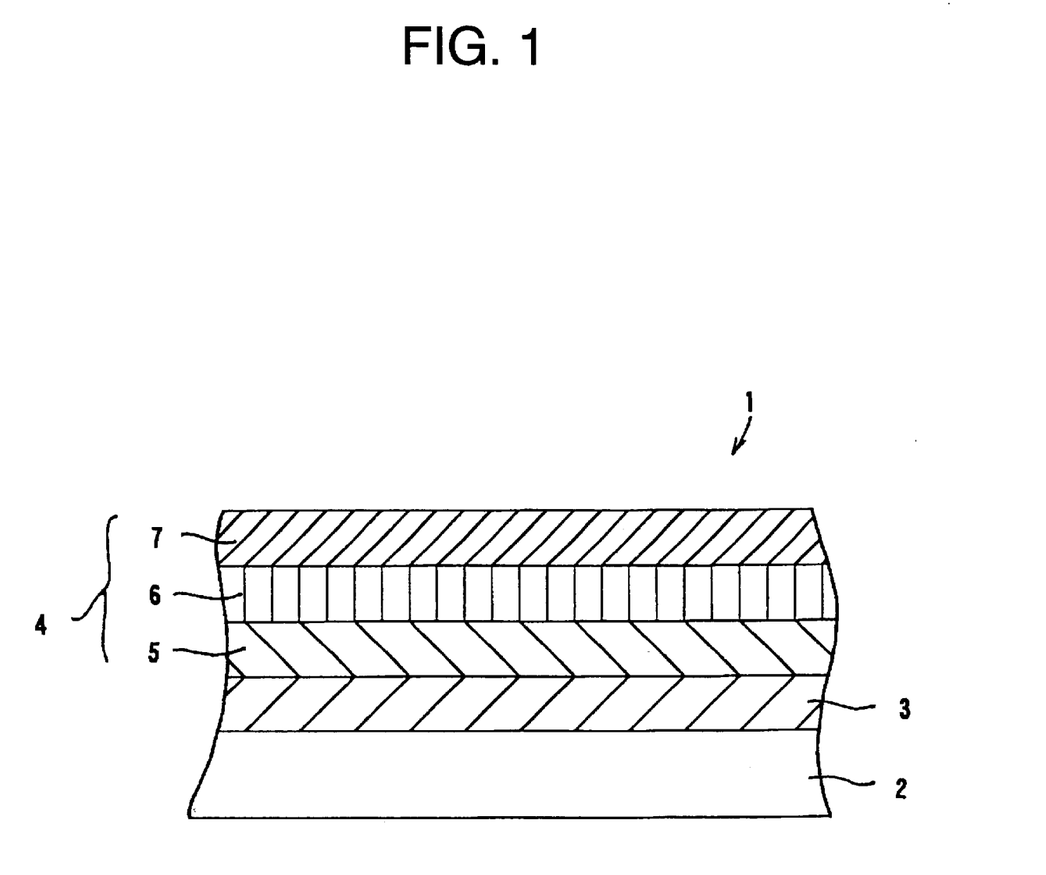
FIG. 1 is a schematic cross-sectional view showing one example of an anti-reflection film relating to the first embodiment of the present invention.

FIG. 1 is a schematic cross-sectional view of an anti-reflection film relating to the first embodiment of the present invention.

As shown in FIG. 1, an anti-reflection film 1 of the present invention is formed of a substrate 2, a hard coated layer 3 situated on the substrate 2, and a layer stack 4 which is situated on the hard coated layer 3 and in which a plurality of thin layers (5–7) are deposited. And, the layer stack is such that it is formed of thin layers (5,7) formed by a plasma CVD method and a thin layer (6) formed by a sputtering method or a evaporation method.

Like this, the thin layers constituting a layer stack 4 are not all formed only by a plasma CVD method, or only by a sputtering method or a evaporation method, but depending on a thin layer to be formed, by properly using a plasma CVD method, a sputtering method or a evaporation method, both of advantages of a sputtering CVD method (a rate of forming a thin layer is high) and advantages of a sputtering method and a evaporation method (the adherability between thin layers are better and, even when a high refractive index layer is formed, the layer has the resistance to wet heat and a refractive index is stabilized) can be combined and, thus, an anti-reflection film excellent in the reflection preventing function can be obtained.

The structures of a substrate 2, a hard coated layer 3, each thin layer constituting a layer stack 4 (low refractive index layer 7, intermediate index layer 5, high refractive index layer 6), and a layer stack 4, which constitute an anti-reflective film of the present invention, will be explained below.

[Substrate]

First, a substrate 2 is explained. In the anti-reflective film 1 of the present invention, the substrate 2 is a part which is a base of the anti-reflective film 1. The substrate 2 is not particularly limited as far as it is a polymer film which is transparent in a visible light region.

Examples of the polymer film include a triacetylcellulose film, a diacetylcellulose film, an acetate butyrate cellulose film, a polyether sulfone film, a polyacrylic series film, a polyurethane series film, a polyester film, a polycarbonate film, a polysulfone film, a polyether film, a trimethylpentene film, a polyether ketone film, an acrylonitrile film, a methacrylonitrile film and the like. Further, colorless films are more preferably used. Inter alia, monoaxially or biaxially oriented polyester films are suitably used since they are transparent and excellent in the heat resistance and, in particular, a polyethylene terephthalate (PET) film is preferable. In addition, triacetylcellulose is also suitably used in that it has no optical anisotropy. A polymer film having a thickness of around 6 $\mu$m–188 $\mu$m is suitably used.

[2] Hard Coated Layer

Next, a hard coated layer 3 is explained. In the anti-reflective film 1 of the present invention, the hard coated layer 3 is a layer which is formed for the purpose of imparting the strength to the anti-reflection film 1.

As a material for forming the hard coated layer 3 in the anti-reflection film of the invention, the material must be a material which is transparent in a visible region like the substrate 2 and can impart the strength to the anti-reflection film 1 and, as the strength, it is preferable that the hardness of H or larger in a pencil hardness test specified JISK5400 is exhibited, Specifically, it is preferable to use a thermosetting resin and/or an ionizing radiation type resin (these are collectively referred to reaction-curing type resin in the present invention in some cases) and, more specifically, resins containing a relatively large amount of resins having an acrylate series functional group, for example, oligomers or prepolymers of polyester, polyether, acryl series resin, epoxy resin, polyurethane, alkyd resin, siproacetal resin, polybutadiene, polythiol polyene series resin, (meth)acrylate of polyfunctional compounds such as polyhydric alcohol and the like (in the present specification, acrylate and methacrylate are described as (meth)acrylate) which are relatively low-molecular, as well as monofunctional monomers such as ethyl (meth)acrylate, ethyl hexyl (meth)acrylate, styrene, vinyltoluene, N-vinylpyrrolidone and the like, as well as polyfunctional monomers, for example, trimethylolpropane tri(meth)acrylate, hexanediol (meth)acrylate, tripropylene glycol (meth)acrylate, diethylene glycol (meth)acrylate, pentaerythritol tri(meth)acrylate, dipentaerythritol hexa (meth)acrylate, 1,6-hexanediol di(meth)acrylate, neopentl glycol di(meth)acrylate and the like which are diluents, are used.

Further, when the aforementioned ionizing radiation curing-type resin is used as an ultra-violet curing-type resin, it is preferable that the resin is used by mixing acetophenones, benzophenones, Michler's benzoyl benzoate, α-amyloxme ester, or thioxanthones, as a photoinitiator, n-butylamine, triethylamine, tri-n-butylphosphine or the like therein.

Reactive organic silicon compounds represented by the general formula: RmSi(OR')n (wherein R and R' represents an alkyl group having a carbon number of 1–10, m+n=4, and m and n are an integer, respectively) may be contained in the aforementioned ionizing radiation curing-type resin. Examples of such the silicon compound include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-butoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxydilane, dimethylbutoxysilane, methyldimethoxysilane, methylethoxysilane, hexyltrimethoxysilane and the like.

A thickness of such the hard coated layer 3 is usually in a range of 1–30 $\mu$m and, as a method for manufacturing the same, a normal coating method can be used, being not limiting.

[3] Layer Stack

A layer stack 4 in the anti-reflective film 1 of the present invention is formed by depositing thin layers having different optical properties, and is constructed such that the whole layer stack 4 effectively prevents reflection depending on the optical properties of each thin layer (in particular, refractive index) and the layer construction.

Usually, thin layers constituting the layer stack 4 are roughly classified into a low refractive index layer, an intermediate refractive index layer and a high refractive index layer. Herein, in the present invention, a low refractive index layer, an intermediate refractive layer and a high refractive index layer are names for distinguishing respective thin layers when respective thin layers constituting the layer stack 4 are relatively compared by its refractive index. A layer having a relatively high refractive index is referred to as high refractive index layer, a layer having a relatively low refractive index is referred to as low refractive index layer, and a layer having a refractive index between that of the high refractive index layer and that of the low refractive index layer is referred to as intermediate refractive index layer. Generally, a layer having a refractive index of 1.80 or greater is referred to as high refractive index layer, a layer having a refractive index of not less than 1.55 and less than 1.80 is referred to as intermediate refractive index layer, and a layer having a refractive index of less than 1.55 is referred to as low refractive index layer in many cases. Therefore, also in the present invention, a layer having a refractive index of 1.80 or greater is referred to as high refractive index layer, a layer having a refractive index of not less than 1.55 and less than 1.80 is referred to as intermediate refractive index layer, and a layer having a refractive index of less than 1.55 is referred to as low refractive index layer.

Each thin layer will be explained specifically below.

(3–1) Low Refractive Index Layer

A low refractive index layer (7) in the anti-reflective film 1 of the present invention is one of thin layers constituting a layer stack 3, and its refractive index is less than 1.55 ($\lambda$=550 nm). Like this, by using a layer having a relatively low refractive index as a thin layer in a layer stack 4, the layer stack as a whole can effectively prevent reflection. In the anti-reflection film 1 of the present invention, a position in the layer stack 4 occupied by the low refractive index layer (7) is not particularly limited, but it is usually preferable that the low refractive index layer (7) is used in an outermost later (opposite to a hard coated layer 4) in the layer stack 4 as shown in FIG. 1.

In the present invention, a thin layer which can be used as a low refractive index layer (7) is not particularly limited as far as it has the transparency and a refractive index of less than 1.55 ($\lambda$=550 nm). In the present invention, it is particularly preferable that the thin layer is a thin layer which can be formed by a plasma CVD method.

As such the low refractive index layer (7), specifically, there are a silicon oxide layer, a magnesium fluoride layer, a silicon trifluoride layer and the like. Inter alia, it is preferable to use a silicon oxide layer as the low refractive index layer.

The reason is as follows: a refractive index of the silicon oxide layer can be easily rendered less than 1.55 ($\lambda$=550 nm) and, even when the silicon oxide layer is formed by a plasma CVD method, a thin layer excellent in the resistance to wet heat and having a stabilized refractive index can be obtained and, further, a plasma CVD method has a high rate of forming a thin layer. In addition, it is not necessary that a composition of the silicon oxide layer is simply SiOx, but the layer may be a silicon oxide layer containing carbon (SiOxCy). The reason is as follows: by inclusion of carbon in a silicon oxide layer like this, it is easier to render a refractive index of a silicon oxide layer a desired refractive index.

A thickness of such the low refractive index layer is not particularly limited, but it is preferably 10–1000 nm, particularly preferably a range of 50–150 nm. When the thickness is smaller than the above range, the reflection preventing effect is not exerted in some case and, when the thickness exceeds the above range, a whole layer becomes fragile and the moldability is lost in some cases.

Here, a plasma CVD method used upon formation of the low refractive index layer (7) in the present anti-reflection film 1 will be specifically explained.

A plasma CVD method in the present invention is a layer-forming method utilizing the phenomenon that, in a reaction chamber with a prescribed gas introduced therein, a plasma is produced, thereby, an atomic or molecular radical species is produced to attach on the surface of a solid and, in many cases, a volatile molecule is further released by a surface reaction and the molecule is taken onto the surface of a solid. By forming the anti-reflection film of the present invention using a plasma CVD method, a plurality of layers can be effectively formed together. In addition, in the plasma CVD method, there are two kinds of methods of a capacity coupling plasma CVD method and an inductive coupling plasma CVD method depending on a method of applying en electric lower used for generating a plasma and, in the present invention, any plasma CVD method can be used.

Figure 2:
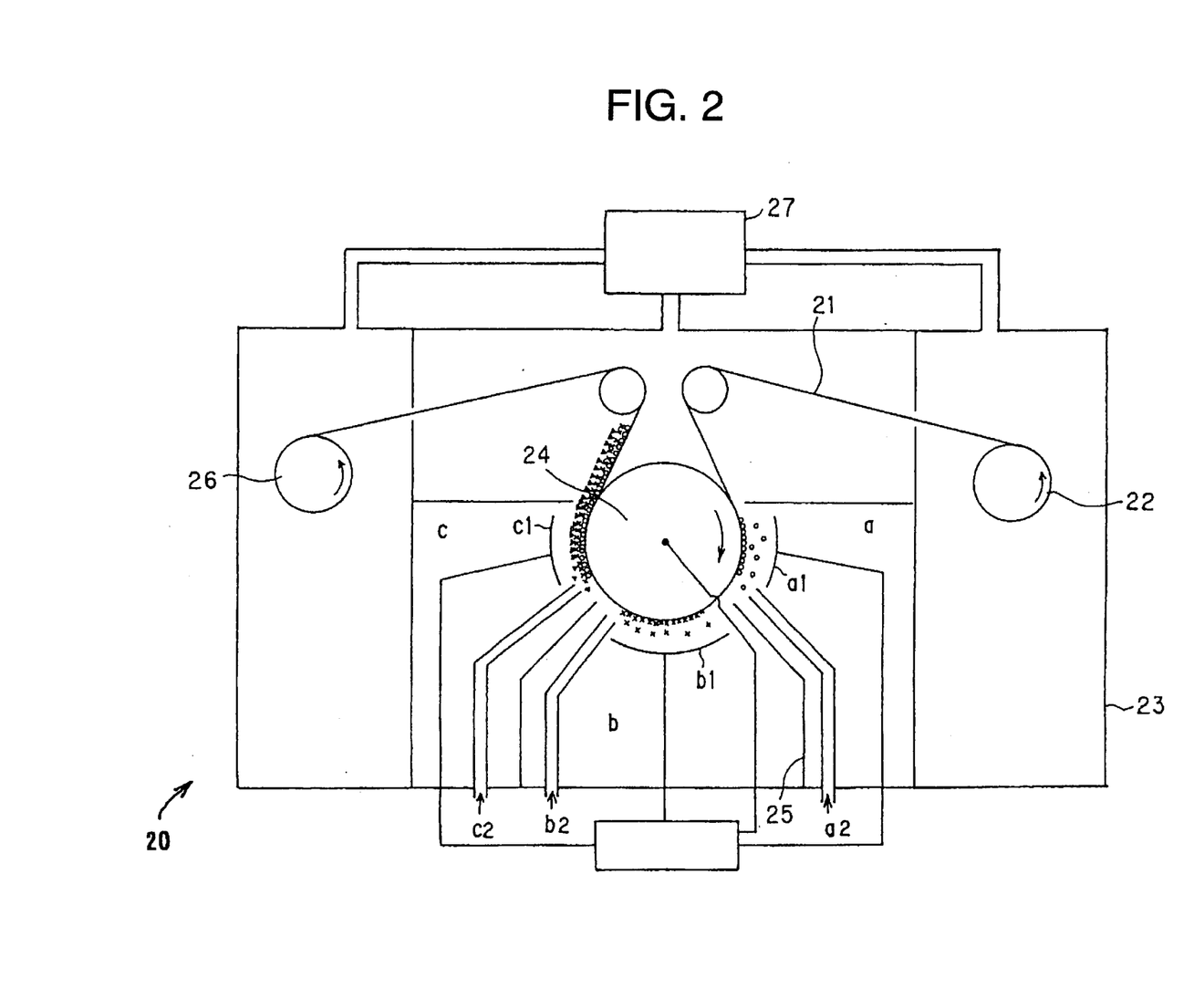
FIG. 2 is a schematic diagram of a plasma CVD apparatus.

Here, in the present invention, among the aforementioned plasma CVD methods, it is particularly preferable to use a plasma CVD apparatus as shown in FIG. 2. The reason is as follows: by using the plasma CVD apparatus, the present anti-reflection film can be continuously prepared, and control of a temperature of a polymer film which is to be a substrate can be accurately performed.

The plasma CVD apparatus 20 shown in FIG. 2 is a capacity coupling plasma CVD apparatus, a web-like polymer film 21 is unwound from a substrate unwinding part 22 and is introduced into reaction chambers (a, b, c) of a vacuum container 23. And, a prescribed layer is formed on a layer-forming drum 24 in the reaction chamber, and is wound by a substrate winding part 26.

The plasma CVD apparatus 20 is such that it has a plurality of (three) reaction chambers, and respective reaction chambers (a, b, c) are formed by being isolated by a partition 25. Here, for convenience in explanation below, the three reaction chambers are named as a reaction chamber "a", a reaction chamber "b" and a reaction chamber "c" from a right side. And, in each reaction chamber, there are disposed electrode plates a1, b1, c1 and raw material gas introducing inlets a2, b2, c2, respectively. Each reaction chamber (a, b, c) is disposed along an outer periphery of a layer-forming drum 24. The reason is as follows: a polymer film from which an anti-reflection layer stack is formed is inserted into a reaction chamber in synchronism with the layer-forming drum 24, and an anti-reflection layer stack is formed on the layer-forming drum and, therefore, each layer can be continuously deposited by such the arrangement.

According to the aforementioned plasma CVD apparatus, by varying a raw material gas to be introduced in each reaction chamber, a layer can be formed independently in each reaction chamber.

In the present invention, when a silicon oxide later as a low refractive index layer (7) is formed by using the aforementioned plasma CVD apparatus (e.g. reaction chamber "a"), it is preferable to use organic silicone as a raw material and, specifically, hexamethyldisiloxane (HMDSO), tetramethyldisiloxane (TMDSO), methyltrimethoxysilane (MTMOS), methylsolane, dimethylsilane, trimethylsilane, diethylsilane, propylsilane, phenylsilane, tetramethoxysilane, octamethylcyclo tetrasilpxane, octamethylcyclotetrasiloxane, tetraethoxysilane and the like can be used.

(3–2) Intermediate Refractive Layer

Then, an intermediate refractive index layer will be explained.

In the anti-reflection film 1 of the present invention, an intermediate refractive index layer (5) is one of thin layers for forming a layer stack 3, and is a thin layer having a refractive index of not less than 1.55 and less than 1.80. The intermediate refractive index layer (5) having such the refractive index is a thin layer for enhancing the reflection preventing function, and is not a thin layer which is inevitably necessary in a layer stack 4. And, a position at which the intermediate refractive index layer is disposed is not particularly limited, but the layer can be disposed at any position as far as the position is such that the reflection preventing function is improved as a whole of the layer stack 4. However, since light reflection can be effectively prevented rather when the aforementioned low refractive index layer (7) and a high refractive index layer (6) are contacted with each other (see FIG. 1), it is preferable that the intermediate refractive index layer (5) is disposed at a part other than a part between the low refractive index layer and the high refractive index layer, for example, below the high refractive index layer as shown in FIG. 1.

In the present invention, a thin layer which can be used as the intermediate refractive index layer (5) is not particularly limited as far as it has the transparency in a visible region and its refractive index is not less than 1.55 and less than 1.80 ($\lambda$=550 nm). In the present invention, it is preferable that the layer is a thin layer which can be formed by a plasma CVD method like the aforementioned low refractive index layer.

As such the intermediate refractive index layer (5), for example, a carbon-containing silicon oxide layer, and fine particles of $Al_2O_3$, SiN, SiON, $ZrO_2$, $SiO_2$ and $ZnO_2$ dispersed in a silicon oxide layer, are suitably used. The reason is as follows: by mixing the aforementioned fine particle into a silicon oxide layer, it is relatively easy to render its refractive index not less than 1.55 and less than 1.80 ($\lambda$=550 nm) and, even when a silicon oxide layer is formed by a plasma CVD method, a thin layer excellent in the resistance to wet heat and having a stable refractive index can be obtained. Since a plasma CVD method has a high rate of forming a thin layer, yield in preparing an anti-reflection film can be improved.

A thickness of such the intermediate refractive index layer is not particularly limited, but is preferably 5–300 nm, particularly preferably 10–150 nm. When the thickness is smaller than 5 nm, the reflection preventing effect is hardly expected and, conversely, when the thickness exceeds 300 nm, there is a possibility that substrate deformation and layer peeling are generated due to stress of a layer in some cases.

Here, a plasma CVD method used upon formation of an intermediate refractive index layer (5) in the anti-reflection film of the present invention is the same as that in the case of the aforementioned low refractive index layer (7) and, therefore, explanation thereof is omitted. In addition, when the plasma CVD apparatus shown in FIG. 2 is used, for example, by using a reaction chamber "b" in order to form the intermediate refractive index layer (5), thin layers having different optical properties (different refractive indices) can be formed by one plasma CVD apparatus.

(3–3) High Refractive Index Layer

Next, a high refractive index layer will be explained.

In the anti-reflection film 1 of the present invention, a high refractive index layer (6) is one of thin layers for forming a layer stack 3, and is a thin layer having a refractive index of not less than 1.80 ($\lambda$=550 nm). By disposing a thin layer having a refractive index of not less than 1.80 ($\lambda$=550 nm) together with the aforementioned low refractive index layer in a layer stack 4, light reflection can be effectively prevented due to a difference in refractive indices. In the anti-reflection film 1 of the present invention, a position occupied by the high refractive index layer (6) in a layer stack 4 is not particularly limited, but as described above, since light reflection can be prevented more effectively rather when a low refractive index layer (7) and a high refractive index layer (6) is contacted with each other, it is preferable to dispose the high refractive index layer below a low refractive index layer.

In the present invention, a thin layer which can be used as the high refractive index layer (6) is not particularly limited as far as it has the transparency in a visible region and its refractive index is 1.80 or greater ($\lambda$=550 nm). In the present invention, it is particularly preferable that the layer is a thin layer formed by a sputtering method or a evaporation method. Like this, by forming the high refractive index layer (6) by a sputtering method or a evaporation method, there can be obtained a high refractive index layer in which although its formation rated is inferior, the resistance to wet heat is excellent and, therefore, a refractive index is stable, further, the adherability with other thin layers is excellent.

As such the high refractive index layer (7), specifically, there are a titanium oxide layer, an ITO (indium/tin oxide) layer, a $Y_2O_3$ layer, an $In_2O_3$ layer, a $Si_3N_4$ layer, a $SnO_2$ layer, a $ZrO_2$ layer, a $HfO_2$ layer, a $Sb_2O_3$ layer, $Ta_2O_5$ layer, a ZnO layer, a $WO_3$ layer and the like and, inter alia, it is particularly preferable that a titanium oxide layer or an ITO layer exhibiting a high resistance are used as a high refractive index layer.

A titanium oxide layer has been previously used as a high refractive index layer of a layer stack in an anti-reflection film and, when a titanium oxide layer is formed by a plasma CVD method like the aforementioned low refractive index layer and intermediate refractive index layer, since the formed titanium oxide layer has the worse resistance to wet heat, there arises a problem that a refractive index is changed by a moisture in the air or the like. However, according to the present invention, since a titanium oxide layer as a high refractive index layer is formed by a sputtering method or a evaporation method, such the problem does not arise. In addition, by formation by a sputtering method or a evaporation method, the adherability with other thin layers (low refractive index layer and intermediate refractive index layer) or a hard coated layer can be improved.

In addition, since an ITO layer has usually the conductivity, it is difficult to form a thin layer by a plasma CVD method, on an ITO layer formed by a sputtering method or a evaporation method. However, since an ITO layer used as a high refractive index layer in the present invention is an ITO layer exhibiting the high resistance, it is possible to form thin layer thereon by a plasma CVD method. Like this, an ITO layer used as a high refractive index layer in the present invention exhibits the high resistance because an oxygen packing rate of the ITO layer is heightened by formation under the oxygen-excessive conditions upon formation of the ITO layer by a sputtering method or a evaporation method. Herein, the "high resistance" in the present invention refers to its sheet resistance of $1 \times 10^4$ to $1 \times 10^{14}$ $\Omega$/sq.

A thickness of such the high refractive layer is not particularly limited, but is preferably 5–300 nm, particularly preferably 10–150 nm. When the thickness is smaller than 5 nm, the reflection preventing effect is hardly expected and, conversely, when the thickness exceeds 300 nm, substrate deformation and layer peeling are generated due to a stress of a layer in some cases.

Here, a sputtering method and a evaporation method which are used upon formation of the high refractive index layer (6) in the anti-reflection film 1 of the present invention will be specifically explained.

A sputtering method in the present invention is a method in which a high energy particle is collided against a solid which is to be a matrix or a thin layer called as a target, and atoms constituting the matrix are released from the surface of the solid, whereby, the released atoms are deposited on the substrate to form a thin layer. Usually, a method is general in which positive ions produced by glow discharge of an inert gas such as argon are accelerated by cathode drop voltage to collide with a negatively biased target, whereby, atoms are sputtered from the surface to deposit a thin layer.

As a sputtering method which is used upon formation of the high refractive index layer (6) in the anti-reflection film 1 of the present invention, all the sputtering methods which have been previously used can be used. Specifically, methods such as an ion beam sputtering method, a high frequency sputtering method, a direct current sputtering method, an ECR sputtering method, a magnetron sputtering method, a reactive sputtering method and the like can be used, being not particularly limited.

Figure 3:
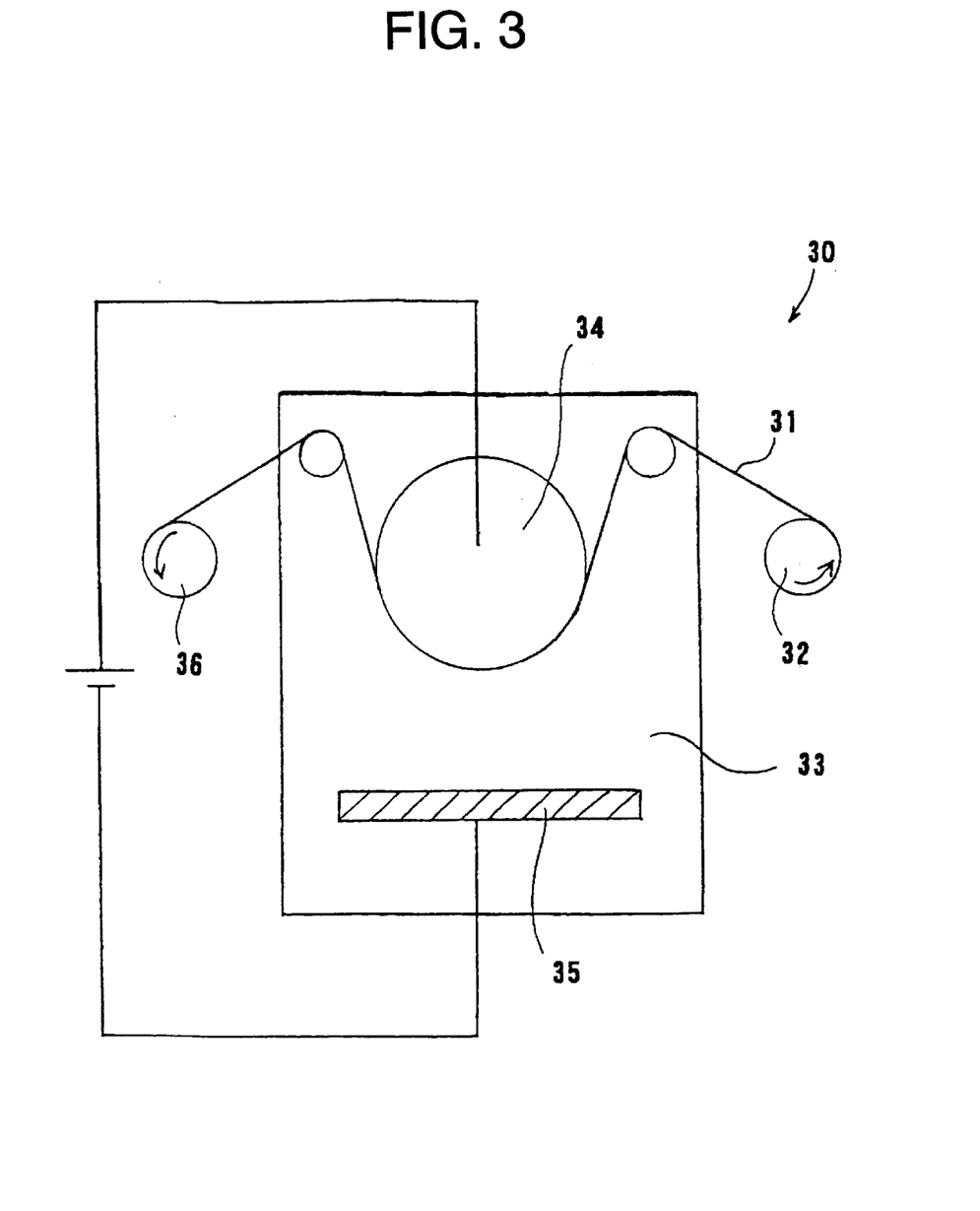
FIG. 3 is a schematic diagram of a sputtering apparatus.

FIG. 3 is a schematic view of a direct current sputtering apparatus for performing a direct current sputtering method among the aforementioned various sputtering methods. In the present invention, a high refractive index layer can be formed by using such the apparatus.

In the direct current sputtering apparatus 30 as shown in FIG. 3, a web-like polymer film 31 as a substrate is unwound by a substrate unwinding part 32, and is introduced into a reaction chamber 33. And, a prescribed layer is formed on a layer-forming drum 34 in the reaction chamber 33, and is wound by a substrate winding part 36.

In the reaction chamber 33 in the direct current sputtering apparatus 30, a target 35 is disposed opposite to a layer-forming drum 34, and a layer-forming drum 34 is an anode and a target 35 is a cathode. And, the interior of the reaction chamber 33 is evacuated (around $10^{-3}$ Pa) and, thereafter, an inert gas such as argon or an oxygen gas is introduced to 1–10 Pa. By applying direct current high voltage between the layer-forming 34 and the target 35, positive ions are collided with an anode (target 35), whereby, a target is sputtered to deposit on a polymer resin on the layer-forming drum 34.

In the present invention, when a titanium oxide layer as the high refractive index layer (6) is formed by using a sputtering method, it is preferable that Ti, $Ti_2O_3$, $TiO_2$ or TiO is used as a target. In addition, an ITO layer as a high refractive index layer (6) is formed, it is preferable to use ITO or an indium/tin alloy as a target.

In addition, a evaporation method in the present invention is mainly a method in which a solid is overheated to evaporate in the vacuum $10^{-6}$ to $10^{-11}$ Torr, and the steam is cooled and condensed on a substrate held at a constant temperature to form a thin layer. In the present invention, all the evaporation methods witch have been previously used can be used, being not particularly limited. In the evaporation method, when a titanium oxide layer as a high refractive index layer (6) is formed, it is preferable to use Ti, $Ti_2O_3$, $TiO_2$ or TiO as a raw material therefor. In addition, when an ITO layer as a high refractive index layer (6) is formed, it is preferable to use ITO or an indium/tin alloy as a law material.

Like this, in the anti-refection film 1 of the present invention, each thin layer constituting a layer stack 4 is formed not only by a plasma CVD method or a sputtering method, but depending on each thin layer, specifically, in a low refractive index layer and an intermediate refractive index layer, a plasma CVD method having a high rate of forming a thin layer is used and, in a high refractive index layer, a sputtering method or a evaporation method which can form a thin layer excellent in the resistance to wet heat and has a stable refractive index is used, whereby, it becomes possible to provide an anti-reflection film having a better yield and having the excellent reflection prevention function upon preparation of an anti-reflection film.

(3–4) Layer Construction

Then, the layer constitution of a layer stack 4 in the anti-reflection film 1 of the present invention will be specifically explained by using the drawings.

In the anti-reflection film 1 of the present invention, the layer construction of the layer stack 4 is not particularly limited, but the layer construction is acceptable as far as a thin layer formed by a plasma CVD method and a thin layer formed by a sputtering method or a evaporation method are contained in the layer construction, and the layer stack as a whole can exert the reflection preventing function.

However, as a layer stack 4, as shown in FIG. 1, it is preferable that an intermediate refractive index layer 5 formed by a plasma CVD method, a high refractive index layer 6 formed by a sputtering method or a evaporation method, and a low refractive index layer 7 formed by a plasma CVD method are deposited in this order from a hard coated layer 3 side. By such the deposition, light reflection can be effectively prevented due to a difference in refractive indices of each thin layer and, at the same time, a high refractive index layer 6 is formed by a sputtering method or a evaporation method and, therefore, the resistance to wet heat is excellent and, at the same time, the adherability with an intermediate refractive index layer which is a lower layer of the high refractive index layer 4, or a low refractive index layer 7 which is an upper layer is excellent.

Figure 4:
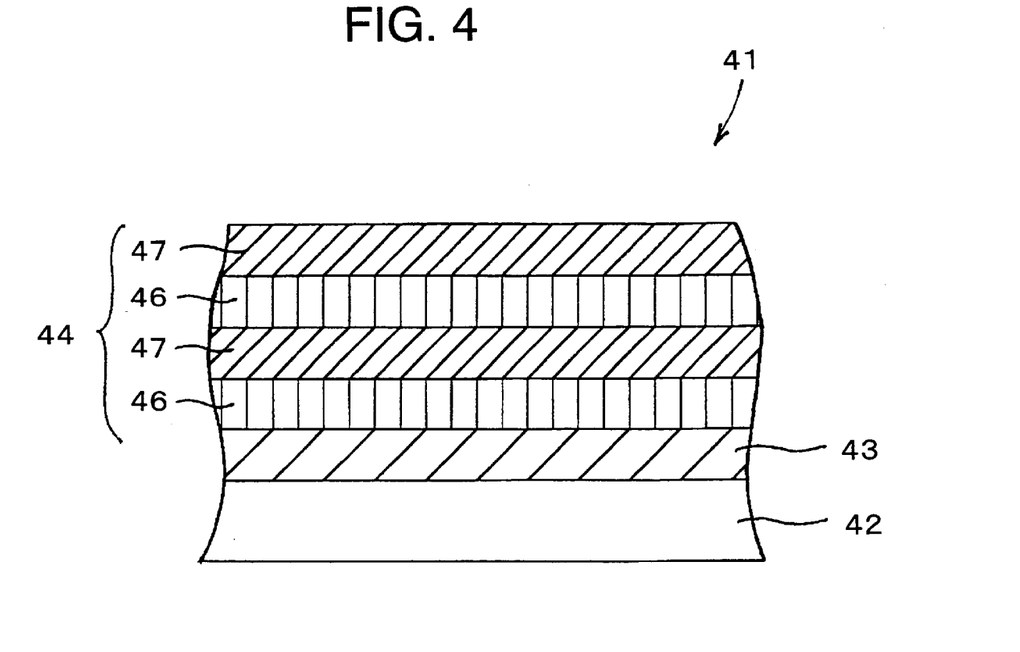
FIG. 4 is a schematic cross-sectional view of another example of an anti-reflection film relating to the first embodiment of the present invention.

In addition, a layer stack 44 shown in FIG. 4 is also preferable in the anti-reflection film of the present invention. As shown in FIG. 4, by alternately depositing a high refractive index layer 46 formed by a sputtering method or a evaporation method and a low refractive index layer 47 formed by a plasma CVD method two times from a hard coated layer 43 side, the reflection preventing effect can be improved.

<Second Embodiment>

Figure 5:
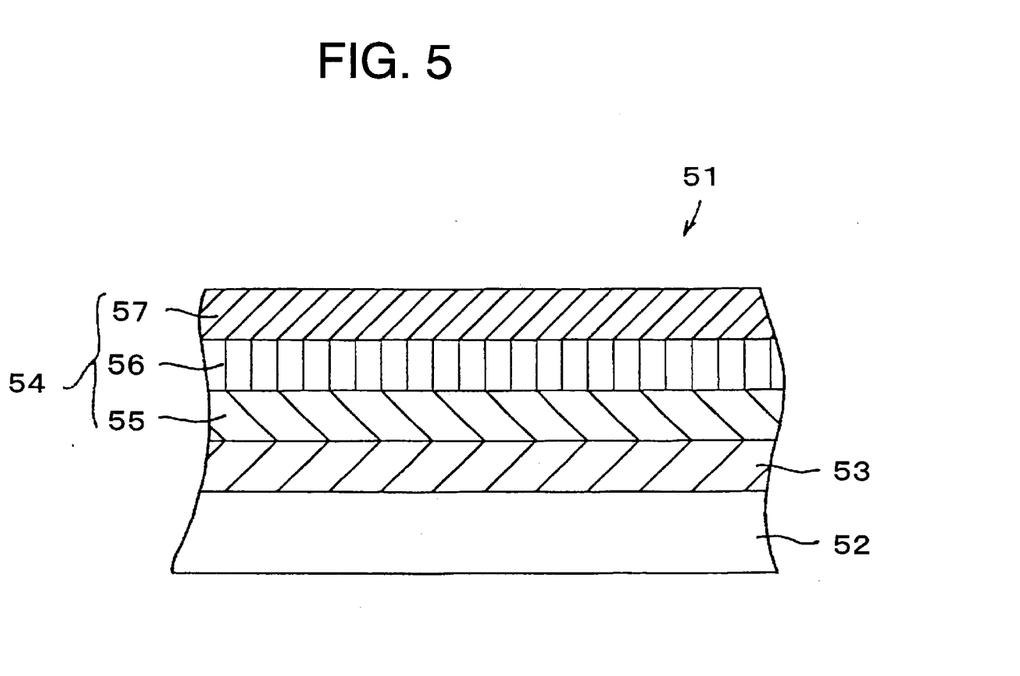
FIG. 5 is a schematic cross-sectional view of an example of an anti-reflection film relating to the second embodiment of the present invention.

FIG. 5 is a schematic cross-sectional view of an anti-reflection film relating to the second embodiment of the present invention.

As shown in FIG. 5, an anti-reflection film 51 relating to the second embodiment of the present invention is such that the film is formed of a substrate 52, a hard coated layer 53 situated on the substrate 52 and, a layer stack 54 which is situated on the hard coated layer 53 and in which a plurality of thin layers (55–57) are deposited, and a silica layer as a low refractive index layer formed by a plasma CVD method having a refractive index of 1.40–1.46 ($\lambda$=550 nm), and having infra-red absorption based on C—H stretching vibration at 2800–3000 $cm^{-1}$ of not greater than 0.1 $cm^{-1}$ and infra-red absorption based on Si—$CH_3$ stretching vibration at 1200–1400 $cm^{-1}$ of not grater than 0.1 $cm^{-1}$, is present in the aforementioned layer stack 54.

[1] Silica Layer as Low Refractive Index Layer

First, a silica layer (57) as a low refractive index layer present in a layer stack in the anti-reflection film 51 relating to the second embodiment of the present invention will be explained.

The silica layer as a low refractive index layer in the present invention has the following exemplified characteristics:

(1) The silica layer is formed by a plasma CVD method.
(2) A refractive index is 1.40–1.46 ($\lambda$=550 nm).
(3) Infra-red absorption based on C—H stretching vibration at 2800–3000 cm$^{-1}$ and infra-red absorption based on Si—CH$_3$ at 1200–1400 cm$^{-1}$ are 0.1 cm$^{-1}$ or smaller, respectively.

The above characteristics (1)–(3) will be specifically explained.

Regarding the Above Characteristic (1)

The silica layer as a low refractive index layer in the present invention is such that it is formed by a plasma CVD method.

Since a plasma CVD method has been already explained in detail, explanation is omitted. When a silica layer is formed by a plasma CVD method, problems on the adherability and a formation rate of the silica layer do not arise. Further, in the previous silica layer formed by a plasma CVD method, there was a problem on the resistance to chemicals. However, since the silica layer as a low refractive layer in the present invention has the following characteristic (2) and (3) at the same time, a problem on the resistance to chemicals dose not arise.

A plasma CVD apparatus used in the present invention is not particularly limited so far as it can control a temperature of a substrate such as a polymer film and the like and, also in an electric source frequency and a plasma producing format, there is no particular limit. For example, the apparatus 20 (see FIG. 2) explained in the aforementioned first embodiment can be used suitably.

In addition, a raw material gas when a silica layer as a low refractive index layer in the present invention is formed by using the plasma CVD apparatus 20 shown in FIG. 2, will be explained.

A raw material gas which can be suitably used upon formation of a silica layer as a low refractive index layer in the present invention is Si alkoxide. More specifically, examples thereof include tetramethoxysilane, tetraethoxysilane, tetrapropoxysilane, di-t-butoxydiacetoxysilane, triethoxysilane, tripropoxysilane and the like. Since such the Si alkoxide contains many O atoms in a raw material, oxidation of Si, C or H in a raw material effectively proceeds. For that reason, there is the characteristic that organic components such as C—H, Si—CH$_3$ and the like are difficult to be mixed into the formed layer. And, the case where, among these Si alkoxides, tetramethoxysilane forms a silica layer as a low refractive index layer in the present invention by the aforementioned plasma CVD apparatus, is particularly preferable. Since tetramethoxysilane contains many O atoms in a raw material and an amount of C—H bonds in a raw material is particularly small, it is easier to form a layer containing no organic components.

Like this, by forming a silica layer using Si alkoxide, in particular, tetramethoxysilane as a raw material gas by a plasma CVD apparatus, organic components contained in the silica layer can be reduced and, as a result, a thin layer excellent in the resistance to chemicals can be obtained.

Regarding the above Characteristic (2)

A silica layer as a low refractive index layer in the present invention has the characteristic that its refractive index is 1.40–1.46.

Since the silica layer as a low refractive index layer in the present invention has the purpose of being utilized as a low refractive index layer in the aforementioned layer stack in an anti-reflection film having a substrate, a hard coated layer and a layer stack, a smaller refractive is better and, when a refractive index is in a prescribed range, the silica layer can be suitably used as a low refractive index layer in a layer stack.

Regarding the above Characteristic (3)

The silica layer as a low refractive index layer in the present invention has the characteristic hat infra-red absorption based on C—H stretching vibration at 2800–3000 cm$^{-1}$ and infra-red absorption based on Si—CH$_3$ stretching vibration at 1200–1400 cm$^{-1}$ are 0.1 cm$^{-1}$ or smaller, that is, are below a detection limit.

That infra-red absorption based on C—H stretching vibration at 2800–3000 cm$^{-1}$ and infra-red absorption based on Si—CH$_3$ stretching vibration at 1200–1400 cm$^{-1}$ are 0.1 cm$^{-1}$ or smaller, means that little C—H bond and Si—CH$_3$ bond are present in the silica layer. That is, it is thought that a carbon compound (organic substance) is not contained in the silica layer as a low refractive index layer in the present invention and, therefore, it is considered that the resistance to chemicals is excellent.

Herein, the aforementioned absorption of infra-red is measured by the known IR spectrum transmission method, and is calculated as a value of $\zeta(\alpha/f)\,df$ in infra-red absorption of each stretching vibration ($\alpha$: absorption coefficient, f: frequency).

By using such the silica layer as a low refractive index layer in a thin layer forming a layer stack 54, since a silica layer as a low refractive index layer in the present invention has a refractive index of 1.40–1.46 ($\lambda$=550), the silica layer can be sufficiently used as a low refractive layer also in the layer stack 54 and, at the same time, since the silica layer as a low refractive index layer in the present invention has the resistance to chemicals even when formed by a plasma CVD method, the silica layer is not dissolved even when treated with an alkali.

A substrate 52, a hard coated layer 53, thin layers (low refractive index layer 57, intermediate refractive index layer 55, high refractive index layer 56) constituting a layer stack 54, which constitute the anti-reflection film 51 relating to the second embodiment of the present invention, will be explained, respectively, below.

[2] [Substrate]

As the substrate 52, all the substrates which can be used in the anti-reflection film relating to the aforementioned first embodiment of the present invention can be used. Therefore, explanation is omitted here.

[3] Hard Coated Layer

As the hard coated layer 53, all the hard coated layers which can be used in the aforementioned first embodiment can be used and, therefore, explanation is omitted here.

[4] Layer Stack

A layer stack 54 in the anti-reflection film 51 relating to the second embodiment of the present invention is formed by depositing thin layers having different optical properties, and is constructed such that the layer stack 54 as a whole effectively prevents reflection due to a difference in the optical properties (in particular, refractive index) of each thin layer and the layer construction.

Each thin layer will be explained specifically below.

(4–1) Low Refractive Index Layer

The anti-reflection film 1 relating to the second embodiment of the present invention is such that, as a low refractive index layer (57), a silica layer as a low refractive index layer in the present invention having the aforementioned three properties is used. Although a refractive index of a low refractive layer in the normal anti-reflection film is less than 1.55 (λ=550 nm), a silica layer as a low refractive index layer in the present invention has a refractive index of 1.40–1.46 (λ=550 nm) and, therefore, the silica layer can be sufficiently used as a low refractive index layer.

In the anti-reflection film 1 of the present invention, a position occupied by the low refractive index layer (57) in a layer stack 54 is not particularly limited, it is usually preferable that the low refractive index layer (57) is used in an outermost layer of a layer stack 54 (opposite to hard coated layer 53) as shown in FIG. 1.

In addition, a thickness of a silica layer as such the low refractive index layer is not particularly limited, but is preferably 10–1000 nm, particularly preferably in a range of 50–150 nm. When the thickness is less than the aforementioned range, the reflection preventing effects is not exerted in some cases. When the thickness exceeds the aforementioned range, a whole layer becomes fragile and the moldability is lacked in some cases.

(4–2) Intermediate Refractive Index Layer

Then, an intermediate refractive index layer will be explained.

In the anti-reflection film relating to the second embodiment of the present invention, an intermediate refractive index layer (55) is one of thin layers forming a layer stack 53, and is a thin layer having a refractive index of not less than 1.55 and less than 1.80. The intermediate refractive index layer (55) having such the refractive index is a thin layer which is used for enhancing the reflection preventing function, and is not a thin layer which is inevitably necessary in a layer stack 54. And, a position at which the intermediate refractive index layer is disposed is not particularly limited, but the layer can be disposed at any position such that the layer stack 54 as a whole enhances the reflection preventing function. However, since light reflection can be more effectively prevented rather when a silica layer (57) as the aforementioned low refractive index layer and a high refractive index layer (56) are contacted to each other (see FIG. 5), it is preferable to dispose the intermediate refractive index layer (55) at a part other than a part between a silica layer as a low refractive index layer and a high refractive index layer, for example, below a high refractive index layer as shown in FIG. 5.

In the present invention, a thin layer which can be used as an intermediate refractive index layer (55) is not particularly limited as far as it has the transparency in a visible region and has a refractive index of not less than 1.55 and less than 1.80 (λ=550 nm). In the present invention, it is particularly preferable that the intermediate refractive index layer is a thin layer which can be formed by a plasma CVD method like a silica layer as the low refractive index layer. By using the plasma CVD apparatus 20 as shown in FIG. 2, it is possible to form a silica layer as a low refractive index layer and, at the same time, an intermediate refractive index layer.

As such the intermediate refractive index layer (55), for example, a carbon-containing silicon oxide layer, and a fine particle of $Al_2O_3$, SiN, SiON, $ZrO_2$, $SiO_2$ and $ZnO_2$ dispersed in a silicon oxide layer are suitably used. The reason is as follows: by mixing the aforementioned fine particle into a silicon oxide layer, it is relatively easy to render its refractive index not less than 1.55 and less than 1.80 (λ=550 nm) and, even when a silicon oxide layer is formed by a plasma CVD method, a thin layer excellent in the resistance to wet heat and having a stable refractive index can be obtained. Since a plasma CVD method has a high rate of forming a thin layer, the cost for preparing an anti-reflection film can be improved.

A thickness of such the intermediate refractive index layer is not particularly limited, but is preferably 5–300 nm, particularly preferably 10–150 nm. When the thickness is smaller than 5 nm, the reflection prevention effect is hardly expected and, conversely, when the thickness exceeds 300 nm, substrate deformation and layer peeling due to a stress of a layer are generated in some cases.

(4–3) High Refractive Index Layer

Then, a high refractive index layer will be explained.

A high refractive index layer (56) in the anti-reflection film 51 relating to the second embodiment of the present invention is one of thin layers forming a layer stack 53, and is a thin layer having a refractive index of 1.80 or greater (λ=550 nm). By disposing a thin layer having a refractive index of 1.80 or greater (λ=550 nm) together with the aforementioned low refractive index layer and intermediate refractive index layer in a layer stack 54, light reflection can be effectively prevented due to a difference in refractive indices. In the anti-reflection film 51 of the present invention, a position occupied by the high refractive index layer (56) in a layer stack 54 is not particularly limited, but as described above, since light reflection can be prevented more effectively rather when a low refractive index layer (57) and a high refractive index layer (56) are contacted to each other, it is preferable to dispose a high refractive index layer below a low refractive index layer.

In the present invention, a thin layer which can be used as a high refractive index layer (56) is not particularly limited as far as it is a thin layer having the transparency in a visible region and a refractive index of 1.80 or greater (λ=550 nm). In the present invention, it is particularly preferable that the high refractive index layer is a thin layer which can be formed by a plasma CVD method, like a silica layer as the aforementioned lower refractive index layer and an intermediate refractive index layer. By using the plasma CVD apparatus described later, a high refractive index layer can be also formed together with a silica layer as a low refractive index layer and an intermediate refractive index layer.

As such the high refractive index layer (56), for example, a titanium oxide layer, an ITO (indium.tin oxide) layer, a zinc oxide layer, a tin oxide layer, a silicon carbide layer, an acidic silicon carbide layer, a silicon nitride layer, a niobium oxide layer, an tantalum oxide layer, a hafnium oxide layer can be suitably used.

In addition, when a titanium oxide layer is used as a high refractive index layer and the titanium oxide layer is formed by the aforementioned plasma CVD apparatus (see FIG. 2), examples of a material which can be used as an organic titanium compound include titanium alkoxides such as $Ti(i-OC_3H_7)_4$(titanium tetra-t-propoxide), $Ti(OCH_3)_4$(titanium tetramethoxide), $Ti(OC_2H)_4$(titanium tetraethoxide), $Ti(n-OC_3H_7)_4$(titanium tetra-n-propoxide), $Ti(n-OC_4H_9)_4$ (titanium tetra-n-butoxide) and $Ti(t-OC_4H_9)_4$(titanium tetra-t-butoxide). Inter alia, $Ti(i-OC_3H_7)_4$(titanium tetra-i-propoxide) and $Ti(t-OC_4H_9)_4$(titanium tetra-t-butoxide) are suitable because they have a high vapor pressure.

As a method of forming a high refractive index layer (56), a sputtering method, a vacuum evaporation method and an ion plating method can be also used in addition to a plasma CVD method.

A thickness of such the high refractive index layer is not particularly limited, but is preferably 5–300 nm, particularly preferably 10–150 nm. When the thickness of a layer is less than 5 nm, the reflection preventing effect is hardly expected and, conversely, the thickness of a layer exceeds 300 nm, substrate deformation and layer peeling are generated due to a stress of a layer.

(4-4) Layer Construction

Then, the layer construction of a layer stack 54 in the anti-reflection film 51 of the present invention will be specifically explained by using the drawings.

In the anti-reflection film 1 of the present invention, it is enough that the aforementioned silica group as a low refractive index layer of the present invention is used, and the layer construction is not particularly limited.

However, as a layer stack, as shown in FIG. 5, it is preferable that an intermediate refractive index layer 55, a high refractive index layer 56, and a low refractive index layer 57 are deposited from a hard coated layer 53 side. By such the deposition, light reflection can be effectively prevented due to a difference in refractive indices of respective thin layers and, at the same time, as a low refractive index layer 57, since a silica layer as a low refractive index layer as a low refractive index layer in the present invention having the aforementioned characteristics (1)-(3) is used, even when a low refractive index layer as an outermost layer is alkali-treated, the silica layer does not dissolve.

Figure 6:
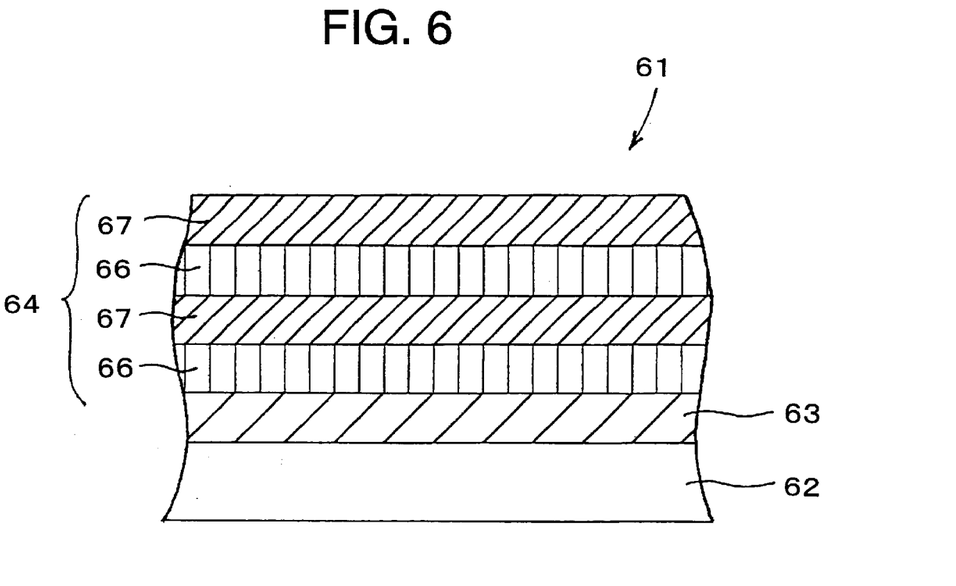
FIG. 6 is a schematic cross-sectional view of another example of an anti-reflection film relating to the second embodiment of the present invention.

In addition, a layer stack 64 as shown in FIG. 6 is also preferable in the anti-reflection film of the present invention. As shown in FIG. 6, by alternately depositing a high refractive index layer 66 and a silica layer as a low refractive index layer in the present invention as a low refractive index layer 67 two times from a hard coated layer 63 side, the reflection preventing effect can be improved.

<Third Embodiment>

An anti-reflection film relating to the third embodiment of the present invention is formed of a substrate, a hard coated layer situated on the substrate, and a layer stack which is situated on the hard coated layer and in which a plurality of thin layers are deposited (not shown, see FIG. 1). And, the aforementioned layer stack is such that (1) a silica layer formed by a plasma CVD method, having a refractive index of 1.40–1.46 ($\lambda$=550 nm), and having infra-red absorption based on C—H stretching vibration at 2800–3000 cm$^{-1}$ of 0.1 cm$^{-1}$ or smaller and infra-red absorption based on Si—CH$_3$ stretching vibration at 1200–1400 cm$^{-1}$ of 0.1 cm$^{-1}$ or smaller, and a high refractive index layer formed by a sputtering method or a evaporation method and having a refractive index of 1.80 or greater ($\lambda$=550 nm) are present therein.

That is, the anti-reflection film 71 relating to the third embodiment of the present invention is a combination of the aforementioned first embodiment of the present invention (such that respective thin layers constituting a layer stack are prepared by separate preparation methods) and the second embodiment of the present invention (having the characteristics in a low refractive index layer in a layer stack).

Therefore, details of respective thin layers, and details of the layer construction are omitted here.

EXAMPLES

The present invention will be explained in detail by way of Examples.

Example 1

Using the sputtering apparatus shown in FIG. 3, an ITO layer was formed on a polyethylene terephthalate (PET) film having a thickness of 75 μm which is a plastic film for a substrate. A rate of feeding a polymer film for a substrate upon continuous layer formation in the present example was 0.1 m/min. Other conditions are as follows:

<Layer formation conditions>
  Applied power: 1.0 kW
  Oxygen gas flow rate: 27 sccm
  Temperature of layer formation drum surface (layer-forming temperature): 30° C.
  The aforementioned gas flow rate unit sccm is standard cubic cm per minute.

The measurement result of an ITO layer which was formed on a polyethylene terephthalate film under the above conditions are shown below.

<Results of measuring ITO layer>
  Thickness of layer: 55 nm
  Layer-forming rate: 5.5 nm·m/min
  Refractive index ($\lambda$=550 nm): 2.0
  Sheet resistance: $10^{11}$ Ω/sq <Apparatus used for measuring ITO layer>
  Layer thickness measurement: Ellipsometer (Model: UVISELTM, manufacturer: JOBIN YVON)
  Sheet resistance measurement: MCP-HT450 (manufacturer; Mitsubishi Chemical Corporation.)
  Refractive index measurement: Ellipsometer (Model: UVISELTM, manufacturer: JOBIN YVON)

As the result of formation of an ITO layer described above, a titanium oxide layer having a refractive index of 2.0 and having the uniformity and high insulation was formed on a polyethylene terephthalate film at a layer-forming temperature of 30° C. and a layer-forming rate of 5.5 nm·m/min. In addition, from the results of measurement by an ellipsometer, this ITO layer had an extinction coefficient of 0.003 at $\lambda$=550 nm and was a thin layer having the high transparency. In addition, a polyethylene terephthalate film after formation of an ITO layer had no slight elongation or deformation, being the better state.

Example 2

Using the sputtering apparatus shown in FIG. 3, an ITO layer was formed on a polyethylene terephthalate (PET) film having a thickness of 75 μm which is a plastic film for a substrate. A rate of feeding a polymer film for a substrate upon continuous layer formation in the present example was 0.1 m/min. Other conditions are as follows:

<Layer formation conditions>
  Applied power: 1.0 kW
  Oxygen gas flow rate: 90 sccm
  Temperature of layer formation drum surface (layer-forming temperature): 30° C.

The measurement result of an ITO layer which was formed on a polyethylene terephthalate film under the above conditions are shown below.

<Results of measuring ITO layer>
  Thickness of layer: 14 nm
  Layer-forming rate: 1.4 nm·m/min
  Refractive index ($\lambda$=550 nm): 2.0
  Sheet resistance: $10^{11}$ Ω/sq <Apparatus used for measuring ITO layer>
  Layer thickness measurement: Ellipsometer (Model: UVISELTM, manufacturer: JOBIN YVON)
  Sheet resistance measurement: MCP-HT450 (manufacturer; Mitsubishi Chemical Corporation.)
  Refractive index measurement: Ellipsometer (Model: UVISELTM, manufacturer: JOBIN YVON)

As the result of formation of an ITO layer described above, a titanium oxide layer having a refractive index of 2.0 and having the uniformity and high insulation was formed on a polyethylene terephthalate film at a layer-forming temperature of 30° C. and a layer-forming rate of 1.4 nm·m/min. In addition, from the results of measurement by an ellipsometer, this ITO layer had an extinction coefficient of 0.003 at λ=550 nm and was a thin layer having the high transparency. In addition, a polyethylene terephthalate film after formation of an ITO layer had no slight elongation or deformation, being the better state.

From the above Examples 1 and 2, it was made clear that it is possible to form a thin layer (ITO layer) suitable in a layer stack in an anti-reflection film on a substrate using a sputtering method.

Example 3

As shown in FIG. 1, a layer stack 4 composed of a hard coated layer 3 on a polymer film as a substrate, an intermediate refractive index layer 5 formed by a plasma CVD method, a high refractive index layer 6 formed by a sputtering method, and a low refractive index layer 7 formed by a plasma CVD method was formed to make an anti-reflection film. The formation conditions for each layer are described below:

<Polymer film (2)>
  Triacetylcellulose Thickness 80 μm
<Hard coated layer (3)>
  Ultraviolet-curing type resin PET-D31 (Dainichiseika Color & Chemicals Mfg. Co., Ltd.)
  Formation by coating
  Ultraviolet-curing conditions 480 mJ
  Thickness 6 μm
<Intermediate refractive index layer (5)>
  A carbon-containing silicon oxide layer was formed by the plasma CVD apparatus shown in FIG. 2.
<High refractive index layer (6)>
  The same ITO layer as that of the aforementioned Example 1 was formed under the same conditions.
<Low refractive index layer (7)>
  A silicon oxide layer was made by the plasma CVD apparatus shown in FIG. 2.

Figure 7:
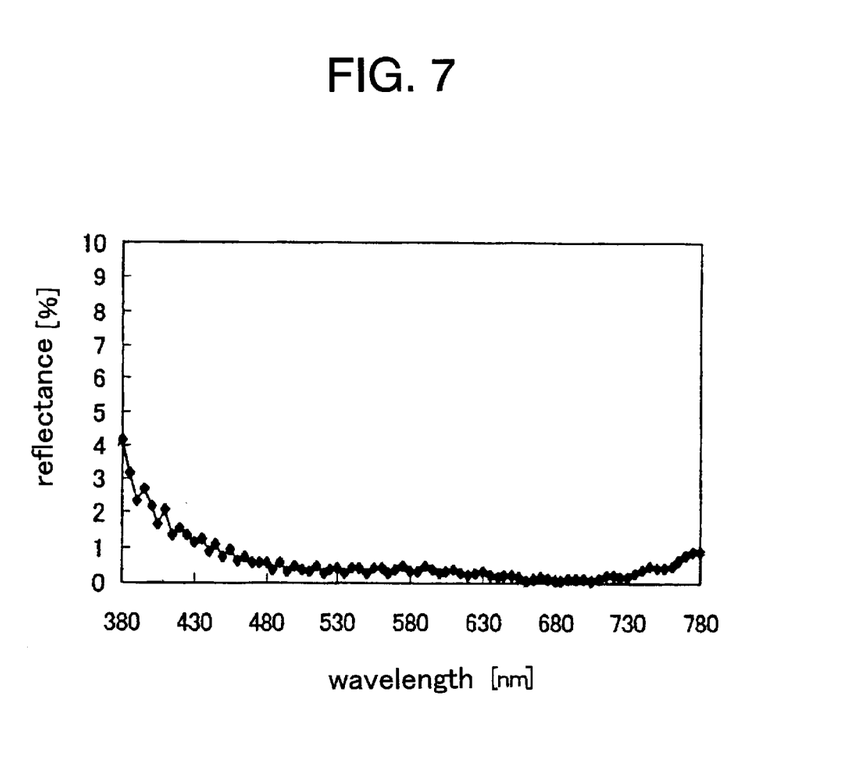
FIG. 7 is a view showing the reflection spectroscopic properties of an anti-reflection film of Example 3.

The anti-reflection film formed under the aforementioned conditions had no slight elongation or deformation of a polymer film, and had the better state. The reflection spectroscopic properties of the anti-reflection film formed under the aforementioned conditions are shown in FIG. 7. From FIG. 7, a reflection rate near 550 nm which can be easily sensed by human being was low, and the reflection preventing effect was better. The visibility reflection rate upon this exhibited the better value of 0.3%.

The spectroscopic reflection rate was measured by the following apparatus.

Spectroscopic reflection rate measurement: Spectrophotometer (Model: UV-3100PC, manufacturer: Shimadzu Corporation)

In addition, a thickness of a layer stackd membrane formed in the aforementioned Example was set such that the visibility reflection rate was minimum in view of the optical properties of each layer. For example, the intermediate refractive index layer, the high refractive index layer and the low refractive index layer shown in Example 2, prescribed membrane thicknesses were obtained by adjusting a film feeding rate upon formation of each thin layer, by using each apparatus for forming each layer.

Example 4

As an Example of an anti-reflection film relating to the second embodiment of the present invention, a silica layer was formed on a hard coated layer formed on a substrate using the apparatus shown in FIG. 2. The conditions under which a silica layer is formed, are shown below:

Raw material gas: tetramethoxysilane gas, oxygen gas
  Plasma formation means: RF wave at 40 kHz
  Substrate: Triacetylcellulose (Fujitack T80UNZ: manufactured by Fuji Photo Film Co., Ltd., thickness: 80μ) was used.
  Hard coated layer: An ionizing radiation-curing type resin (PETD-31: manufactured by Dainichiseika Color & Chemicals Mfg. Co., Ltd.) was coated so that a dry thickness became about 6 μm, which was cured with an electron beam having a radiation dose of 10 Mrad at an acceleration voltage of 175 kV, to obtain an about 6 μm hard coated layer. In addition, in this example, only a reaction chamber A was used.

Under the aforementioned conditions, a silica layer was formed on a substrate. A refractive index of the silica layer was measured, and was found to be 1.42 (λ=550 nm). From this result, it can be seen that a silica layer in Example 4 of the present invention is excellent in the optical properties, and sufficiently functions as a low refractive index layer in a layer stack in an anti-reflection film.

Figure 8:
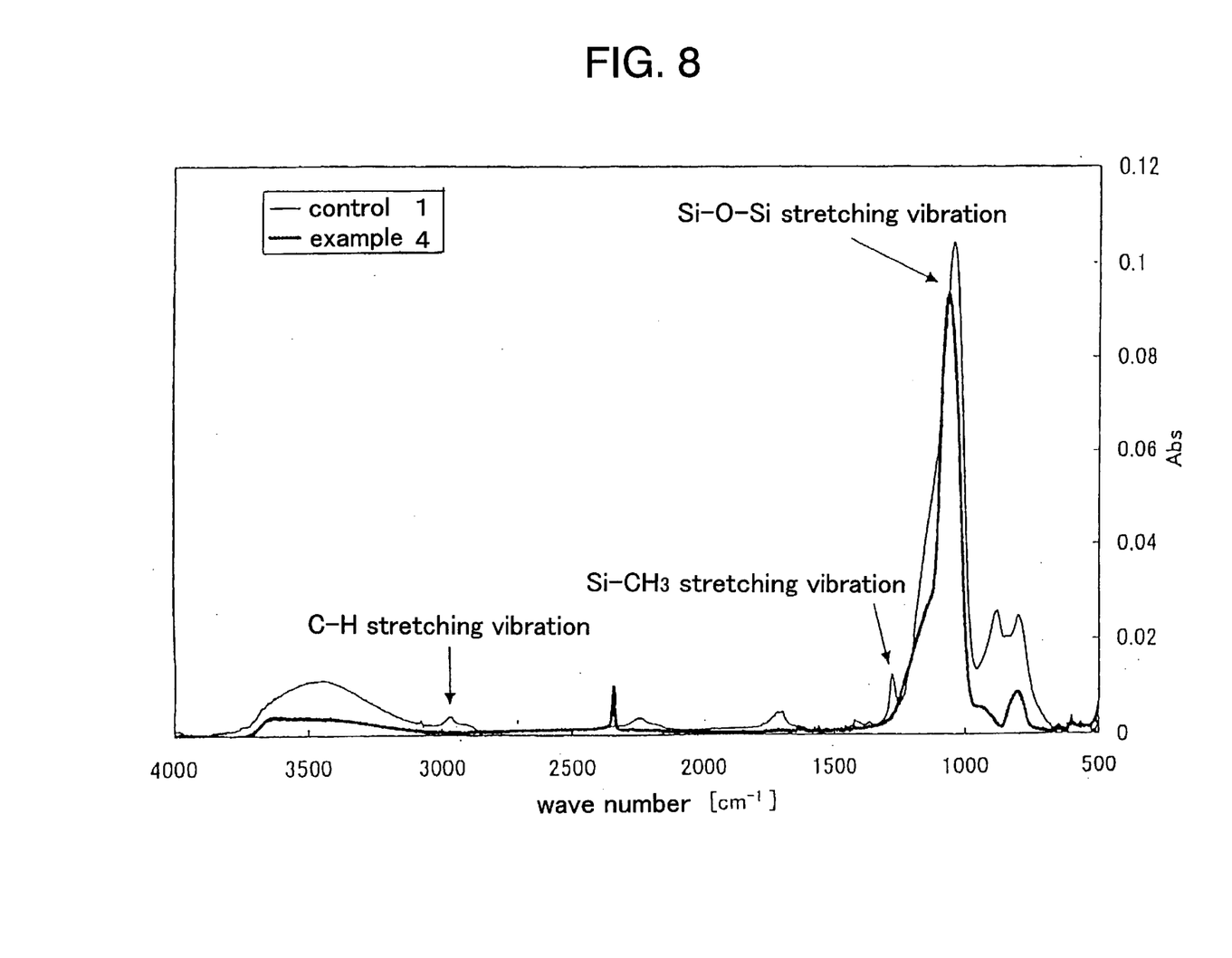
FIG. 8 is an IR chart of a silica layer of Example 4, and a silica layer of Comparative Example 1.

In addition, in order to examine a composition (a carbon content in a layer) of the silica layer, IR measurement was performed. The results of IR measurement are shown in FIG. 8 (bold line). As shown in FIG. 8 (bold line), it is clear that a silica layer of Example 3 of the present invention has infra-red absorption based on C—H stretching vibration at 2800–3000 cm$^{-1}$ of 0.1 cm$^{-1}$ or smaller and infra-red absorption based on Si—CH$_3$ stretching vibration at 1200–1400 cm$^{-1}$ of 0.1 cm$^{-1}$ or smaller, that is, it is below a detection sensitivity. From this result, it can be seen that a silica layer of Example 4 of the present invention contains little C—H bond and Si—CH$_3$ bond and, thus, it can be said that the silica layer is a thin layer having a small amount of organic components.

Further, in order to examine the resistance to chemicals of the silica layer of Example 4 of the present invention, the silica layer was soaked in an aqueous potassium hydroxide solution (2N) overheated at 60° C., for a 1 minute, and the status of the silica layer thereafter was observed. As a result, there is no trace of dissolution in the silica layer, being entirely same in the resistance to chemicals test.

In addition, in measurement of the aforementioned optical properties (refractive index), an ultraviolet and visible spectroscopic analysis apparatus and an ellipsometer were used and, IR measurement, an infra-red absorption spectroscopic analysis apparatus is used.

Comparative Example 1

As Comparative Example of a silica layer (Example 4) as a low refractive index layer in the present invention, a silica layer was formed on a hard coated layer formed on a substrate, using the apparatus of FIG. 2. The conditions under which a silica layer was formed are shown below:

Raw material gas; hexamethyldisiloxane, oxygen gas
  Plasma generation means: RF wave at 40 kHz
  Substrate: Triacetylcellulose (Fujitac T80unz: manufactured by Fuji Photo Film Co., Ltd., thickness: 80 μm) was used.
  Hard coated layer: an ionizing radiation-curing type resin (PETD-31: manufactured by Dainichiseika Color & Chemicals Mfg. Co., Ltd.) was coated at a dry thickness of about 6 μm, which was cured with an electron beam having a radiation dose of 10 Mrad at an acceleration voltage of 175 kV, to obtain an about 6 μm hard coated layer.

Under the aforementioned conditions, a silica layer was formed on a substrate. A refractive index of the silica layer was measured, and was found to be 1.46 ($\lambda$=550 nm).

In addition, in order to examine a composition (a carbon content in a layer) of the silica layer, IR measurement was performed. The results of IR measurement are shown in FIG. 8 (thin line). As shown in FIG. 8 (thin line), in the silica layer of Comparative Example 1, peaks resulting from infra-red absorption based on C—H stretching vibration at 2800–3000 cm$^{-1}$ and infra-red absorption based on Si—CH$_3$ stretching vibration at 1200–1400 cm$^{-1}$ appeared, being 0.22 cm$^{-1}$ and 1.1 cm$^{-1}$, respectively. From this result, it is seen that the silica layer of Comparative Example 1 contains both C—H bond and Si—CH$_3$ bond, and the silica layer can be said to be a thin layer having a high carbon content.

Further, in order to examine the resistance to chemicals of the silica layer of Comparative Example 1, the silica layer was soaked for 1 minute in an aqueous potassium hydroxide solution (2N) overheated at 60° C., the state of the silica layer thereafter was observed. As the result, trace of dissolution was confirmed on the surface of the silica layer.

In addition, the apparatuses used in respective measurements are the same as those in the aforementioned Example 4.

Example 5

As Example of an anti-reflection film relating to the second embodiment of the present invention, an anti-reflection film shown in FIG. 5 was formed by employing the apparatus or FIG. 2. The conditions under which the anti-reflection film was formed are shown below:

In addition, a silicon oxide layer as an intermediate refractive index layer 55 in a layer stack 54 of the anti-reflection film 51 of the present invention shown in FIG. 5 was formed in a reaction chamber "a", a titanium oxide layer as a high refractive index layer 56 was formed in a reaction chamber "b", and a silica layer as a low refractive index layer in the present invention as a low refractive index layer 57 was formed in a reaction chamber "c" (see FIG. 2).

Figure 9:
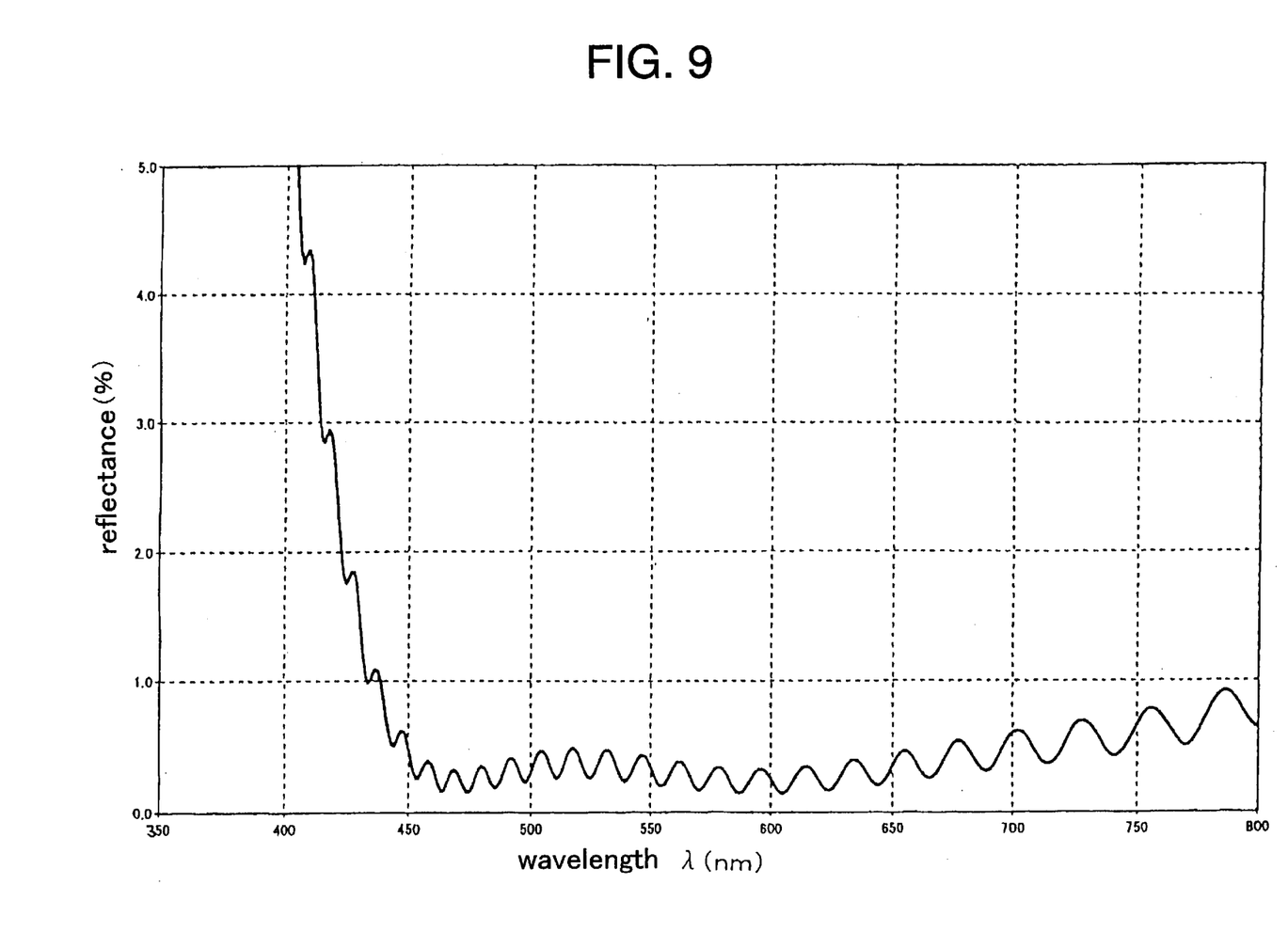
FIG. 9 is a reflection spectrum of an anti-reflection film of Example 5.

Raw material gas: (reaction chamber "a") hexamethyldisiloxane gas, oxygen gas (reaction chamber "b") titanium tetraisopropoxyde gas, oxygen gas (reaction chamber "c") tetramethoxysilane gas, oxygen gas Plasma generation means: RF wave at 40 kHz Substrate: triacetylcelluslose (TAC) film Hard coated layer: electron-curing type acrylic hard coating Under the above conditions, the anti-reflection film of the present invention was formed. The reflection spectrum of the anti-reflection film is shown in FIG. 9. Also apparent from FIG. 9, it is seen that the anti-reflection film of Example of the present invention has the excellent reflection preventing function. In addition, the alkali-treatment was performed upon formation of the anti-reflection film, but trace of dissolution was not confirmed on the surface of a silica layer as a law refractive index layer in the present invention which is an outermost layer and, therefore, the film can be said to be excellent in the resistance to chemicals.

As explained above, according to the anti-reflection film of the present invention, since a layer stack constituting the anti-reflection film of the present invention is formed by depositing a thin layer formed by a plasma CVD method and a thin layer formed by a sputtering method or a evaporation method, a formation rate can be heightened as compared with formation of all the thin layers for forming a layer stack by a sputtering method or a evaporation method, while the adherability between respective thin layers can be improved as compared with formation of all the thin layers by a plasma CVD method.

In addition, by adopting a thin layer formed by a plasma CVD method as a low refractive index layer or an intermediate refractive index layer, and adopting a thin layer formed by a sputtering method or a evaporation method, among thin layers forming a layer stack, no problem arises even when formed by a plasma CVD method (no problem arises in the resistance to wet heat). A formation rate can be heightened by forming a low refractive index layer or an intermediate refractive index layer by a plasma CVD method, while a refractive index of a high refractive index layer can be stabilized by forming only a high refractive index layer in which a refractive index is not stabilized due to worse resistance to wet heat, by a sputtering method or a evaporation method.

Further, since a silica layer as a low refractive index layer in the present invention is formed by a plasma CVD method and has a refractive index of 1.40–1.46 ($\lambda$=550 nm), the silica layer has the excellent adherability, and has a large formation rate. In addition, the silica layer is excellent in the optical properties, can prevent effectively light reflection and, at the same time, can be used as a low refractive index layer in a layer stack of an anti-reflection film.

In addition, since infra-red absorption based on C—H stretching vibration at 2800–3000 cm$^{-1}$, and infra-red absorption based on Si—CH$_3$ stretching vibration at 1200–1400 cm$^{-1}$ are 0.1 cm$^{-1}$ or smaller, respectively, it is clear that little organic components containing a C—H bond is contained in a silica layer and, as a result, it is considered that even a silica layer formed by a plasma CVD method is excellent in the resistance to chemicals.

And, according to an anti-reflection film using the silica layer as a low refractive index layer, since a low refractive index layer constituting a layer stack has the aforementioned properties, whole the layer stack can be formed by a plasma CVD method and, at the same time, a layer stack is not dissolved by the alkali-treatment which is performed upon formation of an anti-reflection film.

What is claimed is:

1. An anti-reflection film having a substrate, a hard coated layer situated on the substrate, and a layer stack which is situated on the hard coated layer and in which a plurality of thin layers are deposited, wherein a silica layer formed by a plasma CVD method, having a refractive index of not less than 1.40 and not greater than 1.46 ($\lambda$=550 nm), and infra-red absorption based on C—H stretching vibration at 2800–3000 cm$^{-1}$ of 0.1 cm$^{-1}$ or smaller and infra-red absorption based on Si—CH$_3$ stretching vibration at 1200–1400 cm$^{-1}$ of 0.1 cm$^{-1}$ or smaller, as a low refractive index layer is present in the layer stack.

2. The anti-reflection film according to claim 1, wherein a raw material upon formation of a silica layer as the low refractive index layer by a plasma CVD method is Si alkoxide.

3. The anti-reflection film according to claim 2, wherein the Si alkoxide as a raw material is tetramethoxysilane.

4. The anti-reflection film according to claim 1, wherein at least one of an intermediate refractive index layer having a refractive index of not less than 1.55 and less than 1.80 ($\lambda$=550 nm) and a high refractive index layer having a refractive index of not less than 1.80 ($\lambda$=550 nm) is present in the layer stack, in addition to a silica layer as a low refractive index layer.

5. The anti-reflection film according to claim 4, wherein the layer construction of the layer stack is the intermediate refractive index layer, the high refractive index layer, and the silica layer as the low refractive index layer, from the hard coated layer side.

6. The anti-reflection film according to claim 4, wherein the layer construction of the layer stack is the high refractive index layer, the silica layer as the low refractive index layer, the high refractive index layer, and the silica layer as the low refractive index layer, from the hard coated layer side.

7. An anti-reflection film having a substrate, a hard coated layer situated on the substrate, and the layer stack which is situated on the hard coated layer and in which a plurality of thin layers are deposited, wherein a silica layer as a low refractive index layer formed by a plasma CVD method, having a refractive index of 1.40–1.46 ($\lambda$=550 nm), and having infra-red absorption based on C—H stretching vibration at 2800–3000 $cm^{-1}$ of 0.1 $cm^{-1}$ or smaller and infra-red absorption based on Si—$CH_3$ stretching vibration at 1200–1400 $cm^{-1}$ of 0.1 $cm^{-1}$ or smaller, and a high refractive index layer formed by a sputtering method or a evaporation method and having a refractive index of not less than 1.80 ($\lambda$=550 nm) are present in the layer stack.

8. The anti-reflection film according to claim 7, wherein an intermediate refractive index layer having a refractive index of not less than 1.55 and less than 1.80 ($\lambda$=550 nm) is present in the layer stack.

9. The anti-reflection film according to claim 8, wherein the layer construction of the layer stack is the intermediate refractive index layer, the high refractive index layer, and the silica layer as the low refractive index layer from the hard coated layer side.

10. The anti-reflection film according to claim 7, wherein the layer construction of the layer stack is the silica layer as the low refractive index layer, the high refractive index layer, the silica layer as the low refractive index layer, and the high refractive index layer from the hard coated layer side.

* * * * *